United States Patent
Sanchez Navarro et al.

(10) Patent No.: US 11,448,188 B2
(45) Date of Patent: Sep. 20, 2022

(54) POWER CONVERTER CONTROL AND OPERATION

(71) Applicant: General Electric Renovables España, S.L., Barcelona (ES)

(72) Inventors: Javier Sanchez Navarro, Barcelona (ES); Domenico Ricchiuto, Barcelona (ES); Leonardo Mandrioli, Milan (IT); Oriol Caubet Busquet, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 16/924,333

(22) Filed: Jul. 9, 2020

(65) Prior Publication Data

US 2021/0010456 A1   Jan. 14, 2021

(30) Foreign Application Priority Data

Jul. 9, 2019   (EP) .................................... 19382586

(51) Int. Cl.
*F03D 7/02*     (2006.01)
*F03D 9/25*     (2016.01)
*H02J 3/48*     (2006.01)

(52) U.S. Cl.
CPC ............. *F03D 7/0284* (2013.01); *F03D 9/25* (2016.05); *F03D 7/0272* (2013.01); *F05B 2270/337* (2013.01); *H02J 3/48* (2013.01)

(58) Field of Classification Search
CPC ................................. F03D 7/0284; F03D 9/25
See application file for complete search history.

(56) References Cited

U.S. PATENT DOCUMENTS

| | | | |
|---|---|---|---|
| 2010/0320762 A1 | 12/2010 | Letas et al. | |
| 2011/0163546 A1* | 7/2011 | Gupta | F03D 7/042 290/44 |
| 2014/0145440 A1* | 5/2014 | Gupta | F03D 7/0284 290/44 |

(Continued)

FOREIGN PATENT DOCUMENTS

| | | |
|---|---|---|
| EP | 2 360 375 A2 | 8/2011 |
| EP | 2 706 643 A2 | 3/2014 |

(Continued)

OTHER PUBLICATIONS

EPO Search Report, dated Jan. 17, 2020.

*Primary Examiner* — Joseph Ortega
(74) *Attorney, Agent, or Firm* — Dority & Manning, P.A.

(57) ABSTRACT

Methods of operating a wind turbine (1) having a generator (10) and a power converter (60). The methods may comprise: determining a reduced first power setpoint (94) in response to an operational condition; reducing active power from a line-side converter (66) to an electrical grid (80) according to the reduced first power setpoint (94); determining a reduced power setpoint (92) for a machine-side converter (62); reducing a torque applied to the generator (10) by the machine-side converter (62) such that active power according to the reduced second power setpoint (92) is produced by the generator (10); and dissipating a power surplus in one or more resistive elements (68) as long as the second power setpoint is superior to the first power setpoint. Wind turbines configured for such methods are also provided.

14 Claims, 5 Drawing Sheets

(56) References Cited

U.S. PATENT DOCUMENTS

2016/0197559 A1\* 7/2016 Tan ..................... H02P 9/007
  363/35
2016/0333856 A1\* 11/2016 Zabalza ................. G05F 5/00
2018/0034264 A1\* 2/2018 Wagoner ............... H02P 9/007

FOREIGN PATENT DOCUMENTS

WO   WO 2010/002402 A1   1/2010
WO   WO-2010002402 A1 \*  1/2010   ............ H02J 3/1842

\* cited by examiner

POWER CONVERTER CONTROL AND OPERATION

The present disclosure relates to methods for operating a power converter, and in particular a power converter connected to a wind turbine. The present disclosure also relates to methods for operating a wind turbine. And the present disclosure also relates to wind turbines including a generator connected to a power converter.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to an electrical generator, either directly ("directly driven") or through the use of a gearbox. This way, the electrical generator produces electricity which can be supplied to the electrical grid.

The generator may be connected to the electrical grid through a power converter. Such a power converter may include a line-side converter connected to the grid, a machine-side converter connected to a rotor of the generator and a DC-link between the line-side converter and machine-side converter.

The power converter regulates the power output from the generator to the grid, and can control the torque applied to the generator stator. In normal operation of a wind turbine, the active power produced by the generator will be injected into the grid. The power that can be produced by a generator depends on the prevailing wind speed, but also depends on the torque applied to the generator stator. The control of the wind turbine will generally depend on the prevailing wind speed, and the pitch angle of the blades and torque applied to the stator will generally be chosen such as to maximize electrical power generation and electrical power injection into the grid.

However, in some circumstances, an abnormality may occur on the grid, e.g. a high frequency. In accordance with some grid codes, the wind turbine should be able to reduce active power output from the generator towards the grid. For example, a grid code may prescribe the ability to reduce active power output at 25% per second. Other grid conditions can also occur in which there is no abnormality (yet), but an active power reduction is requested from a wind turbine, or from a wind park.

The present disclosure relates to methods and systems designed to be able to cope with such grid conditions. The present disclosure also relates to methods of operating in the case of a shutdown of a wind turbine.

SUMMARY

In one aspect, a method of operating a wind turbine having a generator and a power converter is provided. The method comprises determining a reduced first power setpoint in response to an operational condition, and reducing active power from a line-side converter to an electrical grid according to the reduced first power setpoint. The method further comprises determining a reduced second power setpoint for a machine-side converter, and reducing a torque applied to the generator by the machine-side converter such that active power according to the reduced second power setpoint is produced by the generator. The method further comprises dissipating a power surplus in one or more resistive elements as long as the second power setpoint is superior to the first power setpoint.

In accordance with this aspect, a different power set-point is provided for the line-side converter than for the machine-side converter. The power set-point for the line-side converter may be chosen such as to comply e.g. with a grid requirement in a given moment. A different power set-point may be chosen for the machine-side converter. A divergence between the two set-points may be allowed in order to avoid operational problems of the generator or the (wind) turbine connected to it.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
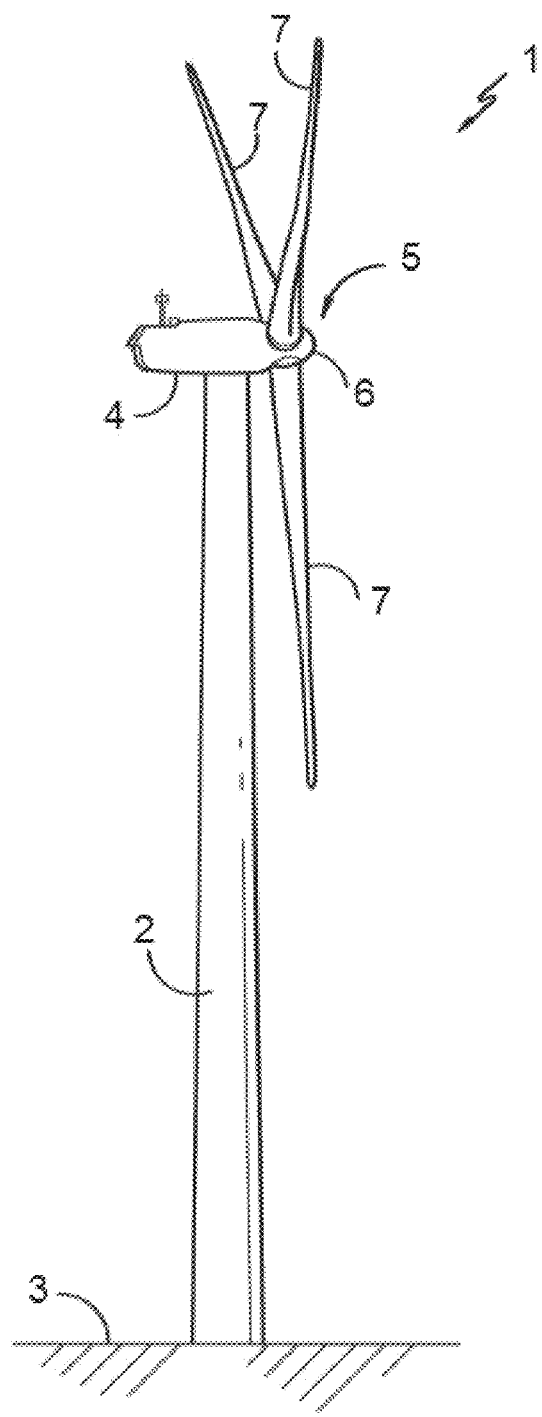
FIG. 1 illustrates a perspective view of a wind turbine according to one example of the present disclosure.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4 at a front region. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
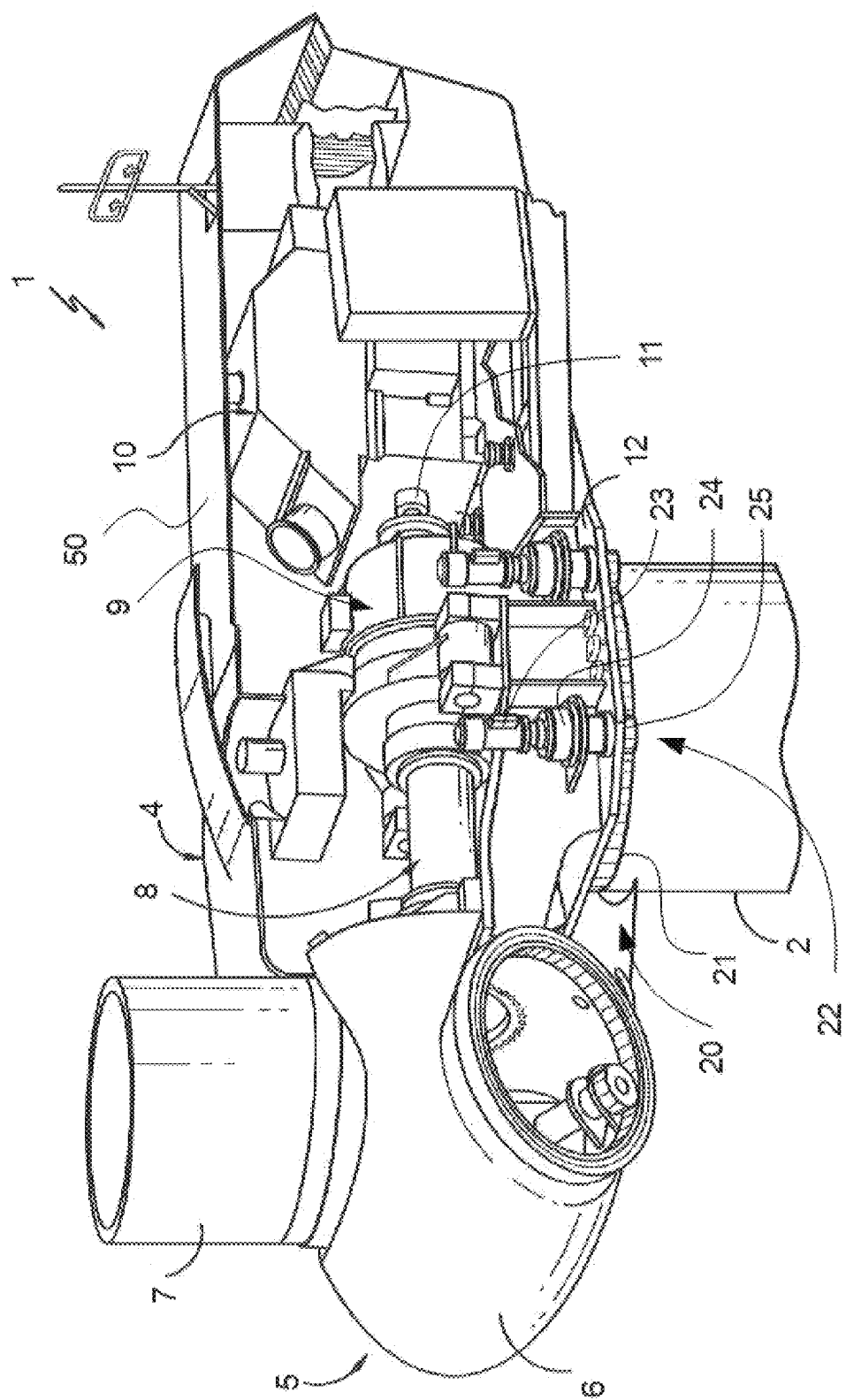
FIG. 2 illustrates a simplified, internal view of a nacelle of a wind turbine according to one example of the present disclosure.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 6 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9. In alternative examples, the hub may be directly coupled to a rotor of the generator and the rotation of the hub may thus drive the rotor of the generator.

The generator 10 may be electrically coupled to the converter. The wind turbine converter may adapt the output electrical power of the generator to the requirements of the electrical grid.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor 23, a gearbox 24 and a pinion 25 for meshing with the annular gear for rotating one of the bearing components with respect to the other.

The nacelle 4 further comprises a cover structure 50 to house wind turbine components. In this example, wind turbine components housed in the cover structure 50 or enclosed by the cover structure comprise the generator 10, the converter, the gearbox 9 and the shaft 8. In other examples, wind turbine components arranged within the nacelle may refer to the converter and the generator.

Figure 3:
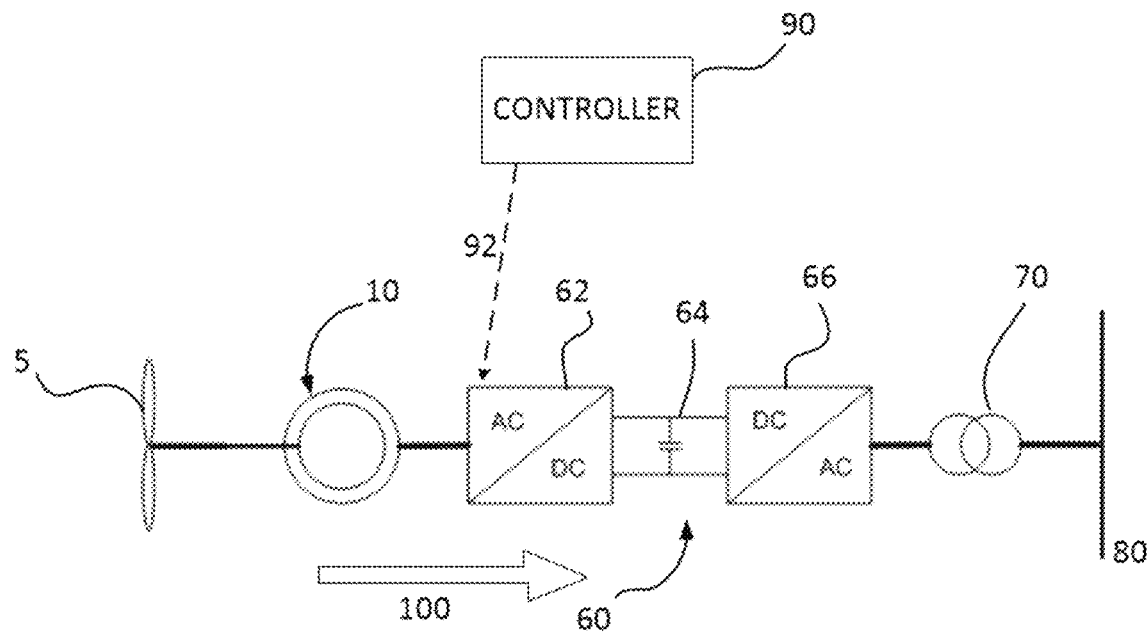
FIG. 3 schematically illustrates a method of operating a wind turbine and a power converter in accordance with an example of the prior art.

FIG. 3 schematically illustrates a method of operating a wind turbine and a power converter in accordance with an example of the prior art. In the example of FIG. 3, a wind turbine comprises a generator 10, which is connected to an electrical grid 80 through a power converter 60. In this particular example, the generator 10 is a permanent magnet generator, including a generator rotor carrying a plurality of permanent magnets. The permanent magnet generator may be directly driven (i.e. without a gearbox) by the wind turbine rotor 5. The wind turbine in this example may be an offshore wind turbine. In this particular example, the stator of the generator 10 is connected to a machine-side converter 62. The machine side converter is connected to a line-side converter 66 through a DC link 64.

The generator 10 is configured to convert mechanical energy to electrical energy having AC voltage and current, and provides the generated AC to the machine-side converter 62. The AC from the generator has a variable frequency, due to varying wind conditions. The machine-side converter 62 is configured to convert or rectify the AC to DC voltage and current delivered to the DC-link 64. The line-side converter 66 converts the DC on the DC-link 64 into fixed frequency AC for the grid 80. The line-side converter 66 may be connected to the grid 80 through a main transformer 70.

In accordance with this example, the power converter 60 receives a single set-point 92 from a controller 90 of the wind turbine. The set-point 92 is based on an optimum operation of the wind turbine in accordance with prevailing meteorological conditions. By controlling the generator torque, a speed of rotation of the generator can be controlled. The speed of rotation of the generator in turn determines the speed of rotation of a wind turbine rotor 5. The speed of rotation may be chosen in accordance with a predefined operation schedule. In particular, it is known to control the wind turbine differently in different wind speed ranges. In wind speed ranges below a nominal wind speed, the speed of rotation may be chosen such that wind impinges on the blades of the rotor at an optimum angle of attack. This method of operating can be maintained until a maximum speed of rotation is achieved.

At higher wind speeds, and in particular above the nominal wind speed, the speed of rotation may be controlled to keep it constant. Maximum torque may be applied to the stator and the blades may be pitched to ensure a constant speed of rotation. Variations with respect to such an optimized operation are possible.

In accordance with the predefined operation, a torque signal 92 may be sent to the machine-side converter by a controller of the wind turbine. The resulting active power output 100 is fed to the grid. The controller 90 of the wind turbine may be a local wind turbine controller, or maybe e.g. a controller for a wind farm.

Figure 4:
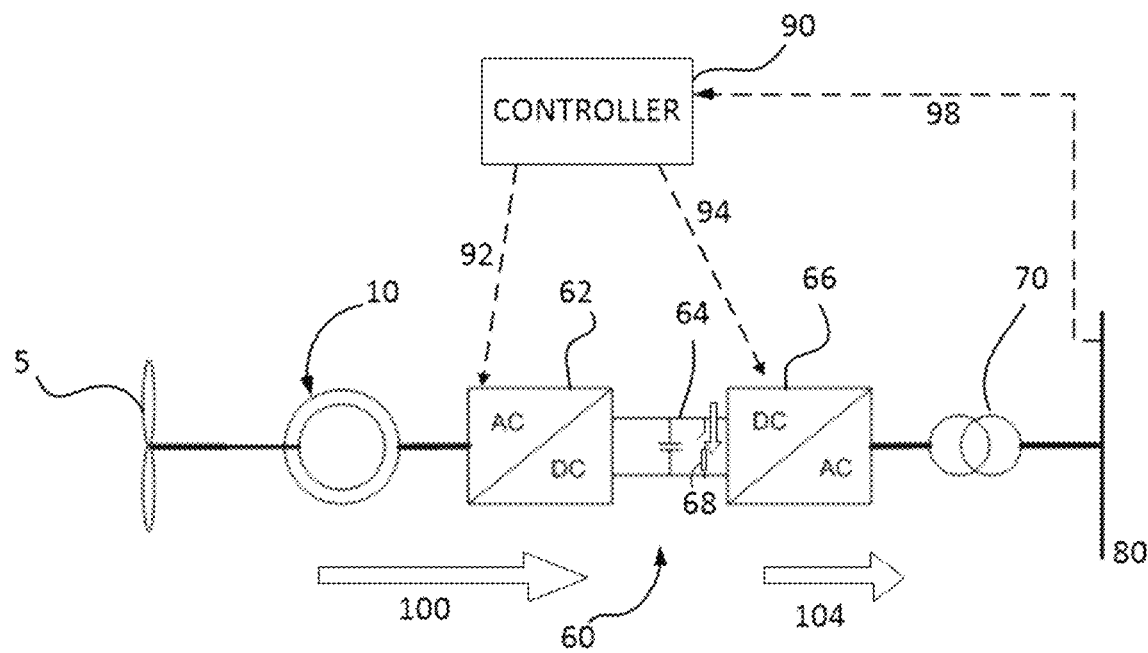
FIG. 4 schematically illustrates a method of operating a wind turbine and a power converter in accordance with an example of the present disclosure.

FIG. 4 schematically illustrates a method of operating a wind turbine and a power converter in accordance with an example of the present disclosure. As in the example of FIG. 3, the wind turbine may comprise a permanent magnet generator 10 having a rotor carrying a plurality of magnets. As in the example of FIG. 3, the generator may be connected to the electrical grid 80 through a power converter 60.

The power converter may comprise a line-side converter 66, a machine-side converter 62 and a DC-link 64. The wind turbine may further include a controller 90, wherein the controller is configured to determine a first power setpoint 94 in response to e.g. a grid condition and send the first power setpoint 94 to the line-side converter 66 and to determine a second power setpoint 92 in response to the grid condition and send the second power setpoint 92 to the machine-side converter 62. The second power setpoint 92 may be higher than the first power setpoint 94.

In accordance with the second set-point, the generator 10 may have a power output 100. However, in accordance with the first set-point, an amount of active power 104 may be fed to the grid.

The wind turbine may furthermore comprise one or more resistive elements in the DC-link, and the power converter may be configured to dissipate a surplus of power from the generator in the resistive elements. The DC-link may include a DC-chopper 68 to dissipate the surplus of power from the generator that cannot be absorbed by the grid. When needed, a switch in the DC-chopper may be closed to divert electrical current through the chopper.

The power delivered by the machine-side converter on the one hand, and the power supplied to the grid on the other hand by the line-side converter indirectly control the operation of the DC-chopper. The setpoints are power setpoints, unlike in the prior art where it is usual to have a setpoint for the voltage at the DC-link and to operate a chopper as a function of the voltage at the DC-link.

The operation based on separate power setpoints allows the converter and the wind turbine to reliably cope with different situations, including different grid abnormalities.

In accordance with this example, a method of operating a wind turbine may be provided. The method comprises determining a reduced first power setpoint 94 in response to an operation condition; reducing active power 104 according to the reduced first power setpoint 94 from a line-side converter 66 to the grid 80; determining a reduced power setpoint for a machine-side converter; and reducing a torque applied to the generator 10 by a machine-side converter 62 such that active power according to the reduced second power setpoint 92 is produced by the generator. The method furthermore comprises dissipating a power surplus (100-104) in one or more resistive elements 68 as long as the second power setpoint is superior to the first power setpoint.

The operational condition may be a grid condition, which may be an abnormal grid condition. The grid condition may be a grid frequency above a predefined threshold. Frequency on the grid may be controlled by the amount of active power supplied to the grid. In response to a high frequency, the wind turbine may be required to reduce the active power output to the grid. Such a response may be defined in a grid code. In accordance with the prior art operation, the generator torque might be reduced. If the generator torque is reduced, the speed of the rotor 5 will tend to increase. This might be counteracted by a brake system and/or by pitching the blades so as to reduce the aerodynamic energy converted. Depending on the wind turbine, such actions may not be sufficient to reduce active power output in accordance with the grid disturbance and grid code.

In accordance with the example disclosed herein, a first nominal power set-point 94 is sent to the line-side converter 66. The line-side converter 66 receives the first set-point and injects electricity 104 to the grid in accordance with this (reduced) set-point 94. At the same time, a second set-point 92 is sent to the machine-side converter 62. In some examples, the reduced second power setpoint 92 is reduced according to a maximum reduction rate. And in some examples, the maximum reduction rate may be determined so as to avoid an overspeed of a rotor 5 of the wind turbine. In other examples, the maximum reduction rate may be determined so as to avoid loads above an acceptable level.

The controller 90 may measure electric variables at the grid (e.g. voltage, frequency, phase angle etc.) and determine a grid condition or grid abnormality autonomously. The wind turbine controller may calculate or otherwise determine a suitable set-point reduction signal. In other case, the controller 90 may receive a set-point reduction signal 98 from the grid. The grid condition may be a particularly high frequency of the grid. Another condition may be a voltage abnormality.

By implementing this control, a wind turbine may be able to comply with grid code requirements. In other cases, the control may serve to reduce loads on the wind turbine.

In some examples, the reduced first power setpoint may be received by the wind turbine from a grid operator. In other examples, the reduced first power setpoint may be determined by the wind turbine, or the controller of the wind turbine. Specifically, the wind turbine may measure a grid frequency and determine an appropriate response. In yet further examples, the wind turbine may receive a measured grid frequency from another entity, e.g. a grid operator or a wind farm controller.

In another example, the grid condition or grid abnormality may be a voltage sage. A voltage sag or "voltage dip" is a sudden increase of voltage of the electrical grid. The voltage in such a sag may be reduced to e.g. 90% or lower of the nominal voltage. In particular, in a voltage sag, a voltage on the grid may be reduced to 30, 20 or 10% of the nominal voltage and may even reach 0 V. A duration of a voltage sage may be very short, but may reach a few seconds.

Grid codes may prescribe that in these conditions, the wind turbine must stay connected to the grid. Similarly as before, first and second power setpoints may be generated for the machine-side and line-side converters. And a surplus of power may be burnt in resistive elements, e.g. a chopper in the DC-link.

In yet a further example, the operational condition may be required or planned shutdown of the wind turbine. When operation is to be interrupted, in a similar manner as before, first and second power setpoints may be generated. The setpoint for the line-side converter in this case is not necessarily prescribed by a grid code.

In some examples, while reducing the generator torque, the method may further comprise pitching blades of a wind turbine rotor to reduce rotational speed of the wind turbine rotor. In accordance with the reduction of the rotational speed of the wind turbine rotor, the second reduced power set-point 92 may be further reduced. A surplus of electrical energy might still be dissipated in the resistive elements. The second reduced power set-point 92 may be reduced in accordance with circumstances until the active power produced by the generator 100 can be fed to the grid 80. Until such a situation is reached, the surplus electrical energy may be burnt in resistors.

In some examples, the method may further comprise monitoring an operation of the resistive elements to avoid the resistive elements reach an operational limit. For example, the method may comprise measuring a temperature of the one or more resistive elements, e.g. in the DC-chopper 68. The temperature in the resistive elements may be measured to make sure they do not reach a critical temperature at which they may fail. Alternatively, the accumulative amount of energy dissipated in the resistive elements may be monitored or calculated. Based on the amount of energy that has been dissipated, it can be calculated or estimated that the resistive elements are close to their operational limits.

In some examples, the method may further comprise dissipating less energy if one or more of the resistive elements reach one of their operational limits. For example, less energy may be dissipated in the resistive elements if the temperature of the resistive elements surpasses a threshold, if the actuation time of the resistive elements surpasses a time threshold, or if the amount of energy that has been dissipated reaches a predetermined level. In some circumstances this can mean that more active power needs to be delivered to the grid than is desirable or prescribed by a grid code. This may be done to avoid tripping of the converter or the wind turbine.

In some examples, the method may further comprise increasing the power output once the grid condition has been resolved. Once the grid condition has been resolved, the wind turbine may be operated again to optimize power output. In these conditions, the control of the power converter may switch back to normal operation in which a single set-point is sent to the power converter to determine the generator torque.

In some examples, method may further comprise ensuring that the rotor speed of the wind turbine does not decrease below a threshold at which the wind turbine becomes hard to control. If necessary, power output may be increased to ensure a minimum rotor speed.

In this particular example, the generator is a permanent magnet generator, and the power converter is a full power converter. In this particular example, the wind turbine may be an offshore direct drive wind turbine. In another example (FIG. 6), the generator may be a doubly-fed induction generator (DFIG), and the drive train may include a gearbox.

Figure 5:
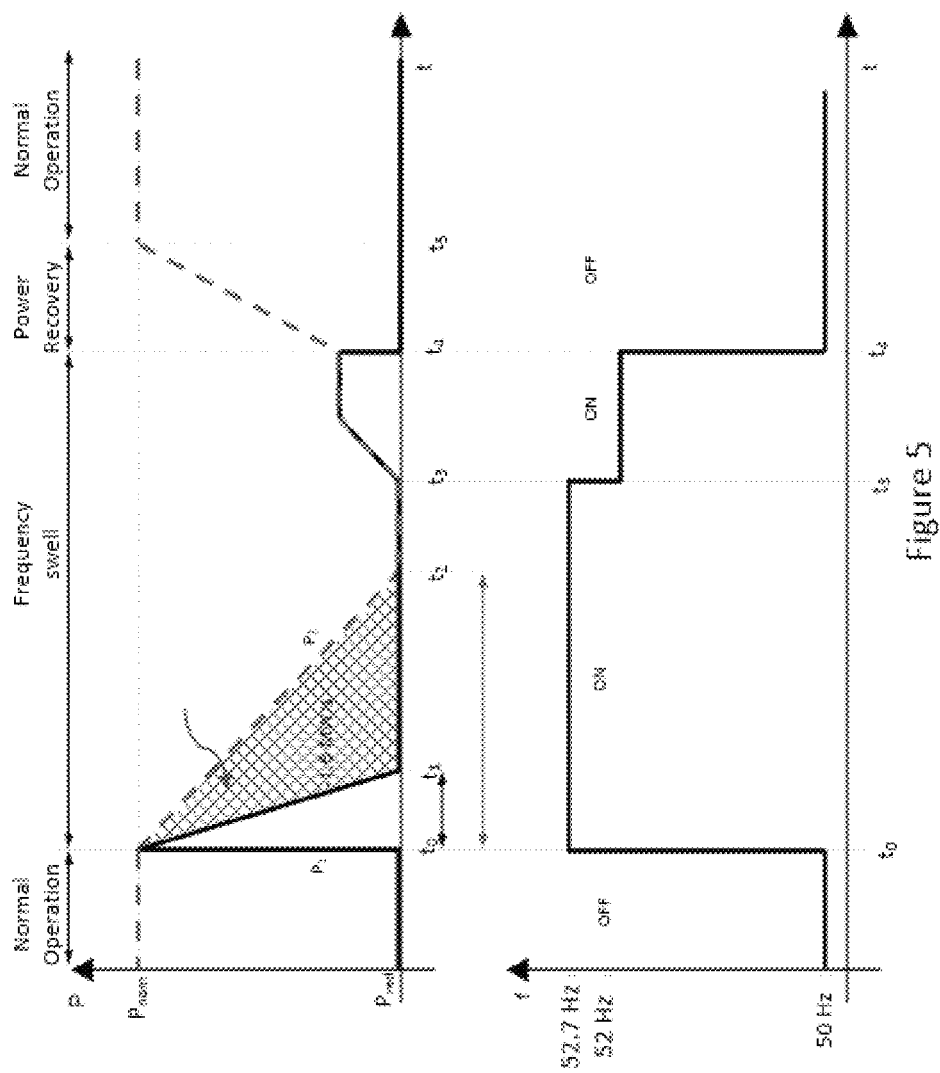
FIG. 5 schematically illustrates a method of operating a wind turbine and a power converter in case of a grid disturbance in accordance with an example of the present disclosure.

FIG. 5 schematically illustrates a method of operating a power converter in case of a grid disturbance in accordance with an example of the present disclosure. In particular, the power converter may be connected to a generator driven turbine, specifically a generator driven by a wind turbine.

A method for operating a power converter connected to an electrical grid is illustrated. The power converter comprises a machine-side converter, a dc-link and a line-side converter. The method comprises determining a grid abnormality; determining a first set-point for active power output of the line-side converter in accordance with the grid abnormality; determining a second set-point for active power output of the rotor-side converter, wherein the second set-point is different from the first set-point.

During a first part (left hand side of the graph), the converter is operated normally. There is no specific grid abnormality or grid condition that requires an active power reduction. In these circumstances, the only commands received by the power converter is a command relating to the machine-side converter. In this particular example, nominal power may be generated $P_{nom}$. In the case of an offshore wind turbine, $P_{nom}$ may be e.g. 6 MW, 10 MW or 12 MW.

When a frequency swell occurs on the grid at $t_0$, two set-points instead $P_1$, $P_2$ may be sent. The "frequency control mode" may be activated. In this frequency control mode, a first set-point $P_1$ for the grid-side converter, and a second set-point $P_2$ for the machine-side converter are determined (e.g. calculated) separately. It may be seen in the graph, that the set-point $P_1$ for the grid-side converter may be rapidly reduced to comply with grid conditions. The second set-point $P_2$ cannot be reduced quickly as it might lead to unsafe condition for the wind turbine, or to high loads due to an overspeed of the wind turbine rotor. The ramp of the second set-point may be as high as possible to avoid such problems. In one example, the ramp may be e.g. 0.4 MW/s. In comparison, the ramp for the reduction of $P_1$ may be e.g. two-four times higher and the reduced power output may be reached at $t_1$.

It may be seen in the graph, that as long as the second-power setpoint $P_2$ is higher than the first set-point $P_1$ (until $t_2$), energy needs to be dissipated. This may be done by passing electrical current through one or more resistors in the DC-link.

At $t_2$, the second set-point is equal to the first set-point. This means that the power output from the generator is injected into the grid and no further electrical energy needs to be dissipated. The power produced by the generator $P_{red}$ may be smaller than in normal operation before the grid abnormality.

At $t=t_3$, there is still a grid condition but the frequency swell is lower than it was in the beginning of the grid condition. The first set-point of the machine side converter $P_1$ may thus be increased, and at the same time, the second set-point $P_2$ may also be increased. Power output may thus be increased without the need for dissipating energy in the resistors.

At $t=t_4$, the grid returns to normal conditions. The frequency control mode may be deactivated and normal operation may be resumed. The first set-point for the grid side converter is no longer sent to the converter. The machine-side converter is controlled to gradually increase the power output to return to normal conditions at $t_5$.

Figure 6:
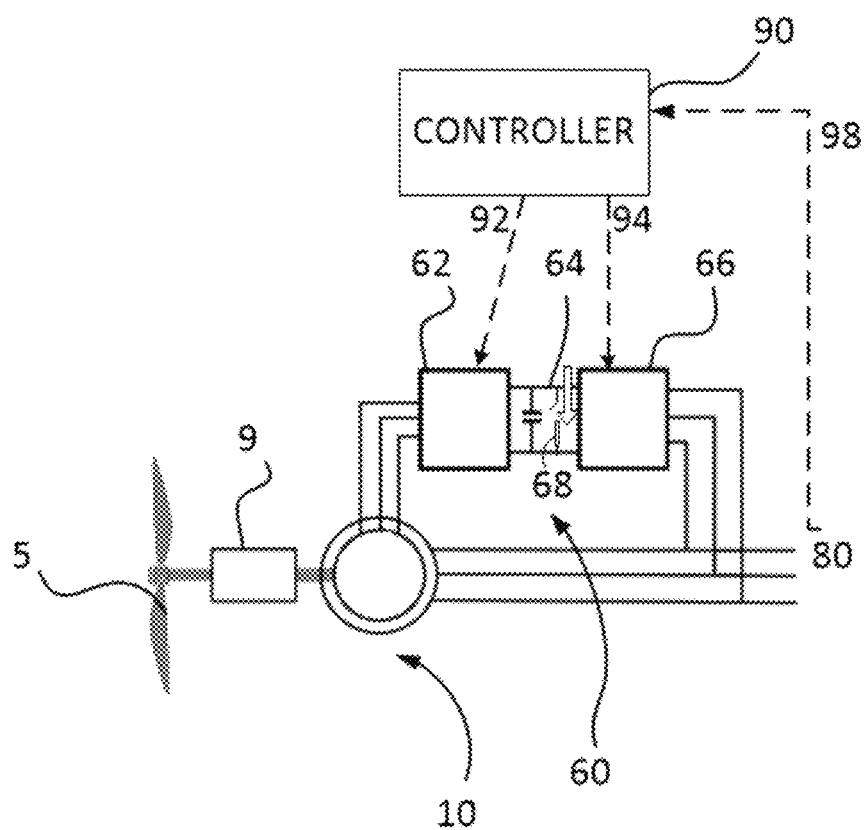
FIG. 6 schematically illustrates a method o operating a power converter in accordance with a further example.

FIG. 6 schematically illustrates a method of operating a power converter 60 in accordance with a further example.

In this particular example (similarly to the arrangement of FIG. 4), the wind turbine comprises a wind turbine rotor 5 with a plurality of blades, and a generator 10 operatively connected with the wind turbine rotor 5, and a power converter 60 electrically connecting the generator 10 to an electrical grid 80, wherein the power converter 60 includes a line-side converter 66, a machine-side converter 62 and a DC-link 64. The wind turbine in this example further comprises a controller 90. The controller may be configured to determine a first power setpoint 94 in response to a grid condition and send the first power setpoint 94 to the line-side converter 66 and to determine a second power setpoint 92 in response to the grid condition and send the second power setpoint 92 to the machine-side converter 62, wherein the second power setpoint 92 is higher than the first power setpoint 94.

In this particular example of FIG. 6, the generator 10 may be a doubly fed induction generator (DFIG). The generator 10 may be driven by a gearbox 9. With this specific topology of the generator, the machine-side converter 62 is electrically connected with the generator rotor. The stator of the generator is directly coupled with the electrical grid. "Directly" as used herein means that there is no converter in between the stator and the grid. Depending on the circumstances, a transformer may be arranged between the grid 80 and the stator.

The operation of the wind turbine and converter may generally be the same as was described before with reference to FIGS. 4 and 5. The methods of operating may be more effective in the configuration with a permanent magnet generator and a full power converter because all electrical power passes through the converter, as opposed to the DFIG configuration of FIG. 6.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of operating a wind turbine having a generator and a power converter, the method comprising:
   in a normal operating state, supplying active power from the generator to an electrical grid through a power converter having a line-side converter and a machine-side converter;
   in response to an operational grid condition, determining a first power setpoint for control of the line-side converter to reduce active power supplied from the line side converter to the electrical grid as compared to the active power from the generator to the machine-side converter;
   controlling the first power setpoint to reduce the active power from the line-side converter to the electrical grid at a first reduction rate;
   at a same time as determining the first power setpoint, determining a second power setpoint for control of the machine-side converter such that a torque applied to the generator by the machine-side converter reduces the active power from the generator and maintains the active power from the generator greater than the active power from the line-side converter to the electrical grid;

controlling the second power setpoint to reduce the active power from the generator at a second reduction rate that is less than the first reduction rate, wherein the active power from the generator reduces at the second reduction rate and remains greater than the active power from the line-side converter to the electrical grid as the active power from the line-side converter reduces at the first reduction rate; and dissipating an active power surplus between the active power from the generator and the active power from the line-side converter to the electrical grid in one or more resistive elements as long as the second power setpoint is greater than the first power setpoint.

2. The method according to claim 1, wherein the operational condition of the electrical grid is an increase in frequency of the grid.

3. The method according to claim 1, wherein the operational condition of the electrical grid is a voltage sag.

4. The method according to claim 1, wherein the second power setpoint is reduced according to a maximum reduction rate.

5. The method according to claim 4, wherein the maximum reduction rate is determined to avoid an overspeed of a rotor of the wind turbine.

6. The method according to claim 1, wherein the first power setpoint is received by the wind turbine from a grid operator.

7. The method according to claim 1, wherein the first power setpoint is determined by the wind turbine in response to a measured electrical grid variable.

8. The method according to claim 1, further comprising pitching blades of a wind turbine rotor to reduce rotational speed of the wind turbine rotor.

9. The method according to claim 1, further comprising monitoring an operation of the resistive elements to avoid the resistive elements reaching an operational limit, and dissipating less energy in the resistive elements if one or more of the resistive elements reach an operational limit.

10. The method according to claim 1, further comprising increasing the active power from the generator once the condition of the electrical grid has been resolved.

11. A wind turbine comprising:
a wind turbine rotor with a plurality of blades;
a generator operatively connected with the wind turbine rotor;
a power converter electrically connecting the generator to an electrical grid, wherein the power converter includes a line-side converter, a machine-side converter and a DC-link, and a controller, wherein
the controller is configured to operate the wind turbine in accordance with the method of claim 1.

12. The wind turbine according to claim 11, further comprising one or more resistive elements in the DC-link, and wherein the power converter is configured to dissipate the surplus of active power in the resistive elements in the DC-link.

13. The wind turbine according to claim 11, wherein the controller is configured to lower the second power setpoint as quickly as possible.

14. The wind turbine according to claim 11, wherein the generator is a permanent magnet generator, and the power converter is a full power converter.

* * * * *